Dec. 29, 1936. C. J. BRISTOL 2,065,644

WHEEL HOLDER

Filed Jan. 10, 1935

Inventor
Cyrus J. Bristol
by Orwig & Hague Attys.

Patented Dec. 29, 1936

2,065,644

UNITED STATES PATENT OFFICE 2,065,644

WHEEL HOLDER

Cyrus J. Bristol, Des Moines, Iowa, assignor to Globe Machinery & Supply Company, Des Moines, Iowa, a corporation of Iowa Application January 10, 1935, Serial No. 1,161

5 Claims. (Cl. 144—288)

The objects of my invention are to provide a wheel holder of simple, durable and inexpensive construction especially adapted for holding automobile wheels for tire changing purposes and the like.

Another object is to provide a wheel holder of this class in which the wheel may be readily and easily placed upon the wheel holder in a horizontal position and then clamped in said position and thereafter tilted to the inclined position desirable by the operator for tire servicing operations.

A further object is to provide a device of this character in which a single cylinder may be employed and the wheel firmly held against rotation when being serviced.

A further object is to provide a device of this class in which the wheel is firmly clamped and held in position by fluid pressure, and then when the pressure is relieved, the wheel clamping members are automatically separated for the convenience of the operator in removing the wheel.

My invention consists in the construction, arrangement and combination of the various parts of the device, whereby the objects contemplated are attained, as hereinafter more fully set forth, pointed out in my claims, and illustrated in the accompanying drawing, in which:

Figure 2:
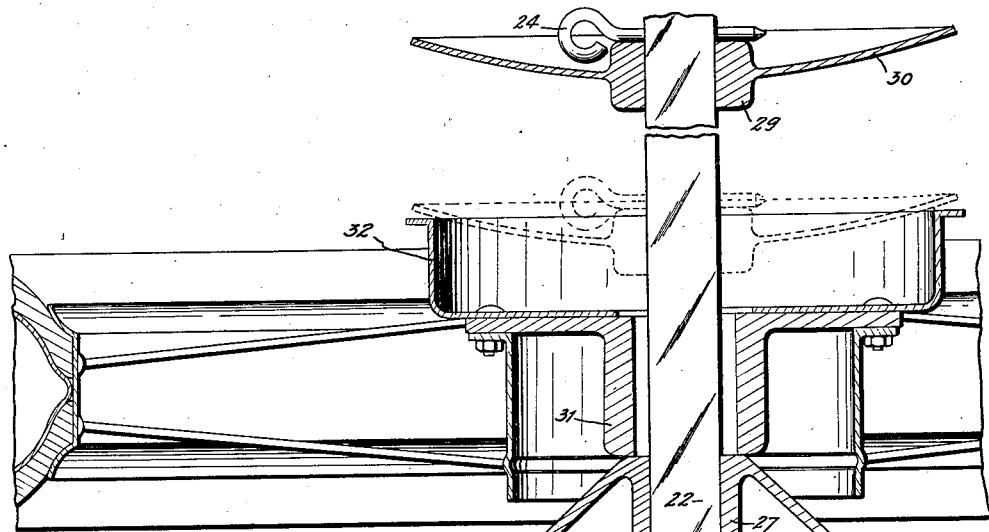
Figure 2 is an enlarged detail vertical sectional view taken on the line 2—2 of Fig. 1.

Referring to the accompanying drawing, I have used the reference numeral 10 to indicate generally the supporting frame having legs to rest upon the floor and having upwardly projecting side members 11 provided with pivot pins 12. In one of these upright members 11 there is a spring actuated latch bolt 13.

There is a single cylinder indicated generally by the numeral 14, closed at its bottom and having a cylinder head 15. This cylinder has an upwardly extended portion 16, having a head at 17 provided with an angular opening, and this extension 16 has openings on opposite sides thereof to receive the pivot pins 12 to thereby support the cylinder and its extension within the stationary frame members 11.

Slidingly mounted within the cylinder is a piston 18, and within the cylinder is a spring 19 to normally hold the piston at its upper limit of movement. Fixed to the piston 18 is a piston rod 20 extended upwardly through a packing 21 in the cylinder head. At the upper end of the piston 20 there is an angular piston rod extension 22 extended through the angular openings in the head 17, so that the said extension may freely slide longitudinally through said head 17, but cannot rotate relative to the head 17.

On the upper end of the extension 22 there is a series of openings 23 through which a pin 24 may be extended.

Mounted on one side of the cylinder 14 is a sector 25 having two notches 26 therein. This sector is arranged adjacent the spring latch 13, and when the spring latch is in one of the openings 26, the cylinder is held in its upright position, and when the cylinder is swung to its tilted position, as shown by dotted lines in Figure 2, the spring latch 13 enters and engages the other one of the notches 26 in the sector, thereby supporting the cylinder at either limit of its movement.

I have also provided a wheel engaging member which comprises a hub portion 27 and a substantially cone shaped body portion 28. This wheel engaging member is provided with an angular opening to slidingly receive the angular extension 22 of the piston.

A second wheel engaging member is provided, and comprises a hub 29, having an angular opening to slidingly receive the angular extension 22, and also having a disc shaped body 30.

In the accompanying drawing I have illustrated an automobile wheel mounted upon the wheel holder, and this wheel comprises a hub 31, having at one side a portion of a wheel brake device indicated generally by the numeral 32.

For supplying fluid pressure to the cylinder I have provided a hose 33 provided with a manually controlled valve 34, and through which fluid pressure may be applied to the cylinder above the piston through the port 35 shown in Figure 2.

In practical operation the operator first places the angular piston rod extension 22 in an upright position where it is supported by the spring latch 13. Then the wheel engaging member 27 and 28 is adjusted to the proper position to meet the requirements of the particular automobile wheel being serviced.

Figure 1:
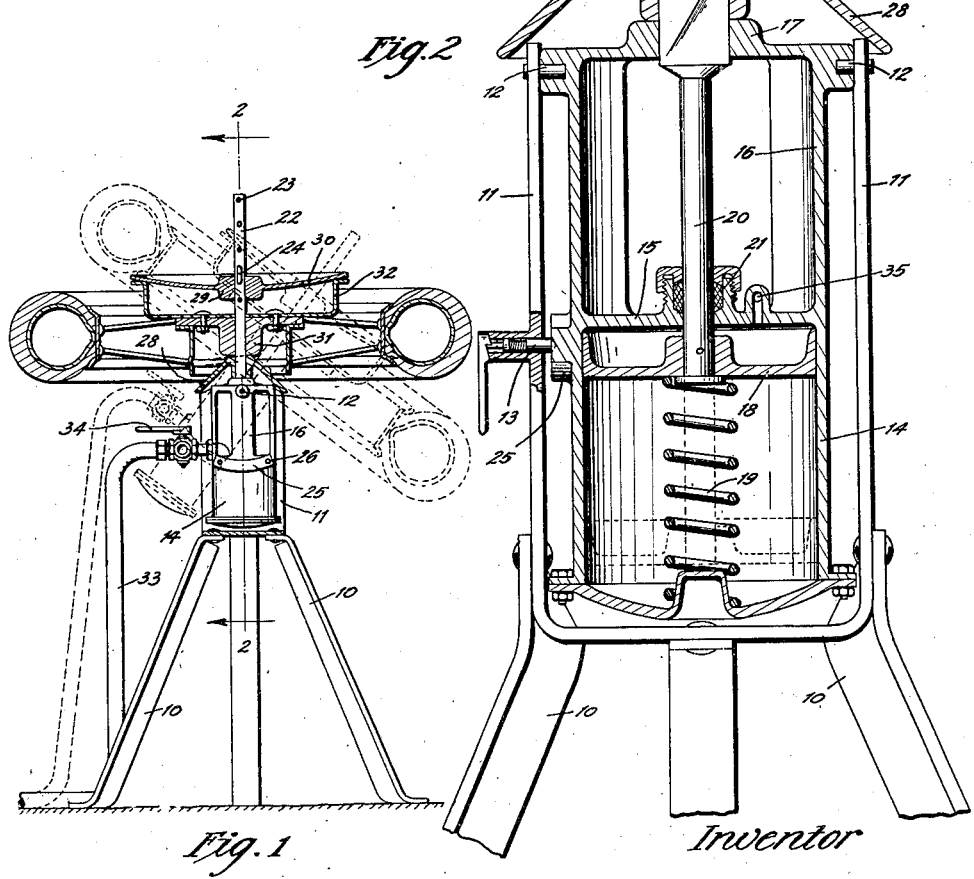
Figure 1 shows a side elevation of a wheel support embodying my invention and illustrating the wheel supported therein, the upper part of the wheel support and the wheel being shown in vertical section. In this figure the dotted lines indicate the position of the wheel when tilted to the position desired for servicing the wheel.

In some instances it is placed in the position shown in Figure 2 for engagement with the wheel hub, and in the event that the nature of the wheel being serviced so requires, this wheel engaging member 27 and 28 may be reversed in its position so that the cone shaped member 28 thereof will engage the adjacent projecting surfaces at one side of the wheel. Obviously, a wheel may be very readily and easily placed upon the upper end of the piston extension 22 and centered relative to said piston extension. Then the wheel engaging member 29 and 30 is applied to the top of the piston rod extension 22, and the pin 24 inserted in one of the openings above it. When that has been done the operator admits air, under pressure, into the cylinder above the piston, in any ordinary manner, and thereupon the piston moves downwardly until the wheel engaging member 29 and 30 firmly engages and supports the wheel between the two wheel engaging members, when the air pressure is permitted to continue under pressure so that the wheel is firmly locked in this position. When the wheel is thus secured, the cylinder and the wheel may be tilted to the positions shown by dotted lines in Figure 1, which is at such an angle that will enable the operator to most readily and conveniently service the wheel tire.

It is obvious that my improved apparatus is of very simple and inexpensive construction, that the entire cylinder and pivotal support therefor may all be cast in one piece, and that the wheel will be firmly held against rotation when being serviced, by means of the simple and inexpensive feature of an angular extension at the upper end of the cylinder extension and the wheel engaging members, and that when in either of its tilted positions it will be firmly held with sufficient force at least for servicing purposes.

I claim as my invention:

1. A wheel holder comprising a supporting frame, a cylinder pivotally mounted in the frame to swing from a substantially upright position to a position considerably inclined from the upright position, means for securing the cylinder in either of said positions, a piston in the cylinder, a piston rod projected upwardly beyond the cylinder, a wheel holding member at the upper end of the piston, a coacting wheel holding member at the top of the cylinder, and means for admitting and discharging fluid pressure to and from the cylinder.

2. A wheel holder comprising a supporting frame, a cylinder pivotally mounted in the frame to swing from a substantially upright position to a position considerably inclined from the upright position, means for securing the cylinder in either of said positions, a piston in the cylinder, a piston rod projected upwardly beyond the cylinder, a wheel holding member at the upper end of the piston, a coacting wheel holding member at the top of the cylinder, means for admitting and discharging fluid pressure to and from the cylinder, and means for preventing the rotation of the piston rod relative to the cylinder.

3. A wheel holder comprising a supporting frame, a cylinder, a piston guide having an angular opening therein fixed to and projected upwardly from the cylinder, means for pivotally supporting said piston guide in said frame, a piston within the cylinder having an angular extension at its upper end slidingly supported in said angular opening to prevent relative rotation of the piston and guide, a wheel engaging member supported on the piston guide, and a cooperating wheel engaging member on the upper end of the piston extension, and means for admitting and exhausting fluid pressure from the cylinder.

4. In a wheel holder, the combination of a supporting frame, a cylinder mounted thereon, a piston within the cylinder having an extension upwardly beyond the cylinder, a wheel holding member supported above the cylinder, a wheel holding member at the upper end of the piston rod extension, means for admitting fluid pressure to the cylinder above the piston to move the piston and the wheel holding member carried thereby downwardly to wheel clamping position, and a spring in the cylinder engaging the under surface of the piston for automatically raising the upper wheel engaging member when the fluid pressure is released from the cylinder.

5. In a wheel holder, a frame, a cylinder carried by the frame, a piston within the cylinder, a spring for normally holding the piston at its outer limit of movement, a piston rod having its outer portion angular in cross section and extended through an angular opening in a nonrotatable portion of the device, and two wheel engaging members each having an angular opening therein through which the angular portion of the piston rod is extended, the outer wheel engaging member being detachable from the piston rod, and means for holding it against outward movement relative to the piston rod.

CYRUS J. BRISTOL.